US009428346B2

(12) United States Patent
Gao et al.

(10) Patent No.: US 9,428,346 B2
(45) Date of Patent: Aug. 30, 2016

(54) PICK-AND-PLACE DEVICE OF GLASS SUBSTRATE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Baocai Gao, Beijing (CN); Guanghai Liu, Beijing (CN); Yu Yang, Beijing (CN); He Wang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 2 days.

(21) Appl. No.: 14/400,969

(22) PCT Filed: Dec. 13, 2013

(86) PCT No.: PCT/CN2013/089330
§ 371 (c)(1),
(2) Date: Nov. 13, 2014

(87) PCT Pub. No.: WO2015/027617
PCT Pub. Date: Mar. 5, 2015

(65) Prior Publication Data
US 2015/0344240 A1 Dec. 3, 2015

(30) Foreign Application Priority Data
Aug. 30, 2013 (CN) .......................... 2013 1 0388901

(51) Int. Cl.
*B65G 49/06* (2006.01)
*B62B 3/02* (2006.01)

(52) U.S. Cl.
CPC .............. *B65G 49/062* (2013.01); *B62B 3/02* (2013.01); *B65G 49/061* (2013.01)

(58) Field of Classification Search
CPC ...... B65G 49/062; B65G 49/061; B62B 3/02
USPC ........................................ 211/85.8
See application file for complete search history.

(56) References Cited

U.S. PATENT DOCUMENTS

| 6,510,950 B1 * | 1/2003 | Piazza .................. B65G 49/062 211/1.57 |
| 2003/0146066 A1 * | 8/2003 | Ashton ................ B65G 49/061 198/346.2 |

(Continued)

FOREIGN PATENT DOCUMENTS

| CN | 88200271 U | 11/1988 |
| CN | 1648086 | 8/2005 |

(Continued)

OTHER PUBLICATIONS

Office Action issued in corresponding Chinese Application No. 2013103889018 dated Mar. 23, 2015.

(Continued)

*Primary Examiner* — Korie H Chan
(74) *Attorney, Agent, or Firm* — Baker Hostetler LLP (57) ABSTRACT

The present invention discloses a pick-and-place device of a glass substrate, comprises a bracket and a substrate holder, the substrate holder comprises a first support part, a second support part and a sliding part, the first support part is provided on the second support part by the sliding part, the first support part is capable of moving with respect to the second support part between a first position and a second position under the action of the sliding part, and when the first support part is located at the first position, the first support part integrally protrudes outward of the second support part, when the first support part is located at the second position, the first support part is integrally located right above the second support part.

16 Claims, 5 Drawing Sheets

(56) References Cited

U.S. PATENT DOCUMENTS

| | | | | |
|---|---|---|---|---|
| 2006/0104794 | A1* | 5/2006 | Kim | B65G 49/061 414/744.6 |
| 2006/0196376 | A1* | 9/2006 | Piazza | B65G 49/061 101/477 |
| 2008/0150244 | A1* | 6/2008 | Carlei | B65G 49/061 280/35 |

FOREIGN PATENT DOCUMENTS

| | | |
|---|---|---|
| CN | 2905583 Y | 5/2007 |
| CN | 201133985 | 10/2008 |
| CN | 201280146 | 7/2009 |
| CN | 201792880 | 4/2011 |
| CN | 202063556 | 12/2011 |
| CN | 102339778 | 2/2012 |
| CN | 202181063 | 4/2012 |
| CN | 102464210 | 5/2012 |
| CN | 102642716 | 8/2012 |
| CN | 202641779 | 1/2013 |
| CN | 202670741 | 1/2013 |
| CN | 202671741 U | 1/2013 |
| CN | 202703658 | 1/2013 |
| CN | 103434550 | 12/2013 |
| JP | 2000127978 | 5/2000 |
| JP | 2000264216 | 9/2000 |
| JP | 2010095168 | 4/2010 |

OTHER PUBLICATIONS

International Search Report and Written Opinion issued in International Application No. PCT/CN2013/089330 dated Aug. 30, 2013.

Office Action in Chinese Patent Application No. 201310388901.8, dated Sep. 1, 2015.

International Search Report and Written Opinion PCT International Application No. PCT/CN2013/089330, dated Jul. 9, 2014.

Office Action in Chinese Patent Application No. 201310388901.8, dated Feb. 14, 2016.

\* cited by examiner

PICK-AND-PLACE DEVICE OF GLASS SUBSTRATE

CROSS-REFERENCE TO RELATED APPLICATION

This application is the U.S. national phase of PCT Application No. PCT/CN2013/089330 filed on Dec. 13, 2013, which claims priority to Chinese Patent Application No. 201310388901.8 filed on Aug. 30, 2013, the disclosures of which are incorporated in their entirety by reference herein.

TECHNICAL FIELD

The present invention relates to a pick-and-place device, especially relates to a pick-and-place device of glass substrate in the manufacturing field of a liquid crystal panel.

BACKGROUND

Currently, in the high-generation factories, it has two manners to pick and place the glass substrate. One is that the operators pick and place the glass substrate by hand directly, and the other is to use the MGV (Manual Guided Vehicle) device to pick and place the glass substrate.

Manual operations are only proper for picking and placing the small-sized glass substrate, but not for the large-sized glass substrate (size of 2500 mm×2200 mm). The reason is that it is impossible for the operators to securely hold such a large-sized glass substrate to pick and place it without breaking or the middle imaging area being contaminated. Picking and placing the glass substrate by hand directly will directly make the glass substrate break or the imaging area being contaminated to be damaged, which causes the losses and makes the clean environment of the workshop polluted.

A manual guiding vehicle comprises a bracket and a substrate holder, wherein the substrate holder is provided on the bracket in the horizontal direction. In order to moving the guiding vehicle easily, the size of the substrate holder will not be set too large but generally match with the size of the glass substrate to be picked and placed. Thus, when the glass substrate is picked and placed by the hand-guided vehicles, due to the limitation of the size of the substrate holder, the movable guide wheels and the bottom pedestal at the bottom of the bracket of the manual guiding vehicle need to extend to the lower position of the pick-and-place apparatus when the glass substrate is picked and placed from the base table of the pick-and-place apparatus, so that the substrate holder can extend to the placement of the glass substrate on the base table of the pick-and-place apparatus to pick and place the glass substrate. However, when the pick-and-place apparatus is manufactured, the lower part of the apparatus will be generally closed with a stainless steel plate for the considerations of dust-proof. As a result, the movable guide wheels and the bottom pedestal at the lower part of the manual guiding vehicle of the prior art often cannot extend to the lower part of the lower part of the apparatus, which make the substrate holder cannot move to the placement of the glass substrate on the base table of the pick-and-place apparatus, leading to that the glass substrate cannot be picked and placed.

SUMMARY

To solve the problems of the prior art, the purpose of the present invention is to provide a pick-and-place device to facilitate stably picking and placing a glass substrate from a base table of a pick-and-place apparatus.

To achieve the above object, the pick-and-place device of a glass substrate of the present invention comprises a bracket and a substrate holder, wherein the substrate holder comprises a first support part, a second support part and a sliding part, the first support part is provided on the second support part by the sliding part, the first support part is capable of moving with respect to the second support part between a first position and a second position under the action of the sliding part, and when the first support part is located at the first position, the first support part integrally protrudes outward of the second support part, when the first support part is located at the second position, the first support part is integrally located right above the second support part.

Further, a rotation axis arranged perpendicular to the moving direction of the first support part is provided below the second support part.

Further, the rotation axis is rotatably provided on the bracket, and the substrate holder is located in a horizontal position or an inclined position driven by the rotation axis.

Further, the rotation axis is detachably provided on the bracket.

Further, an end of the first supporting part is provided with a resist part to prevent a glass substrate placed on the substrate holder at the inclined position from sliding away.

Further, the resist part is an L-shaped baffle that mating with the thickness of the glass substrate.

Further, the resist part is a strip-shaped baffle.

Further, the pick-and-place device further comprises a horizontal positioning mechanism, when the substrate holder is located in the horizontal position, one end of the horizontal positioning mechanism is fixed to the bracket, the other end of the horizontal positioning mechanism is connected to the substrate holder and supports the substrate holder in the horizontal position.

Further, the horizontal positioning mechanism comprises a handle, a support arm and a connecting protrusion, the handle and one end of the support arm are rotatably connected to the bracket by a screw bolt, the other end of the support arm is provided with a slot, the connecting protrusion is provided at a side part of the second support portion and the slot on the other end of the support arm is capable of clasp with the connecting protrusion.

Further, the first support part and the second support part are a support frame composed of four strip-shape metals.

Further, the sliding part comprises a slider and a rail, the slider is provided at a lower surface of the first supporting part, the rail is provided at an upper surface of the second supporting part, the first supporting part is provided on the second supporting part by the slider cooperating with the rail, and the first support part moves between the first position and the second position under the action of the sliding part.

Further, the bracket comprises a support beam and a bottom pedestal, and the support beam is provided at the bottom pedestal in a vertical direction to form an L-shape.

Further, stiffeners are disposed between the support beam and the bottom pedestal.

Further, the bottom of the bottom pedestal is provided with movable guide wheels.

Further, both sides of the second support part are oppositely provided with stoppers to position the glass substrate in the transverse direction.

Further, the first position is the position where the first supporting part is extending, and the second position is the position where the first support part is shrinking.

The substrate holder of the present invention is set to be a retractable structure, when the glass substrate is picked and placed from the base table of the pick-and-place apparatus, there is no need to have the bottom of the pick-and-place device extend below the base table of the pick-and-place apparatus, and by means of the substrate holder extending to the placement of the glass substrate on the base table of the pick-and-place apparatus, it is able to pick and place the glass substrate, which solves the problems that the movable guiding vehicle of the prior art cannot pick and place the glass substrate.

DETAILED DESCRIPTION

To understand the present invention more clearly, the structure of the pick-and-place device of the glass substrate of the present invention will be described in detail referring to the drawings:

As shown in FIGS. 1-9, the pick-and-place device of the glass substrate of the present invention comprises a bracket 1 and a substrate holder 2, and the substrate holder 2 comprises a first support part 21, a second support part 22 and a sliding part 23, and the first support part 21 is provided on the second support part 22 by the sliding part 23, and the first support part 21 is capable of moving with respect to the second support part 22 between a first position and a second position under the action of the sliding part 23, inhere, the moving direction of the first support part 21 is called a first direction, and when the first support part 21 is located at the first position, the first support part 21 integrally protrudes outward of the second support part 22, when the first support part 21 is located at the second position, the first support part 21 is integrally located right above the second support part 22.

Figure 1:
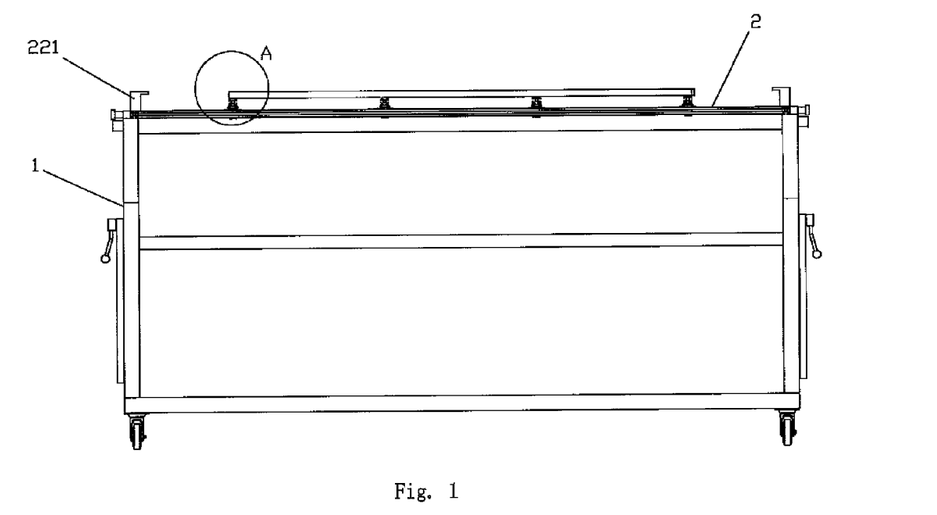
FIG. 1 is a front view of a pick-and-place device of the glass substrate of the embodiment of the present invention.
Figure 2:
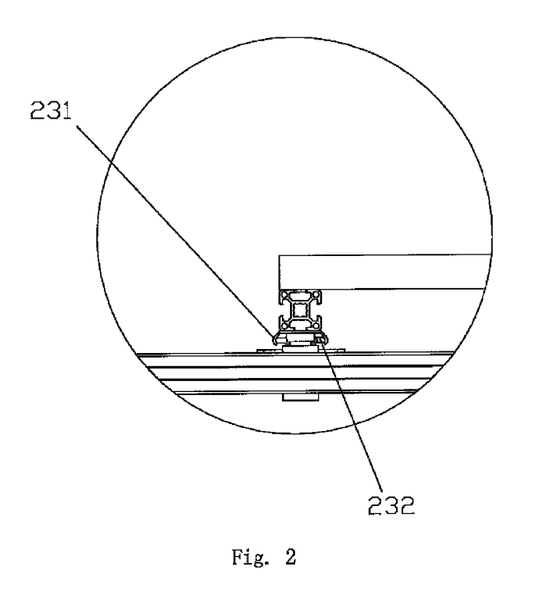
FIG. 2 is an enlarged view of part A in FIG. 1.
Figure 3:
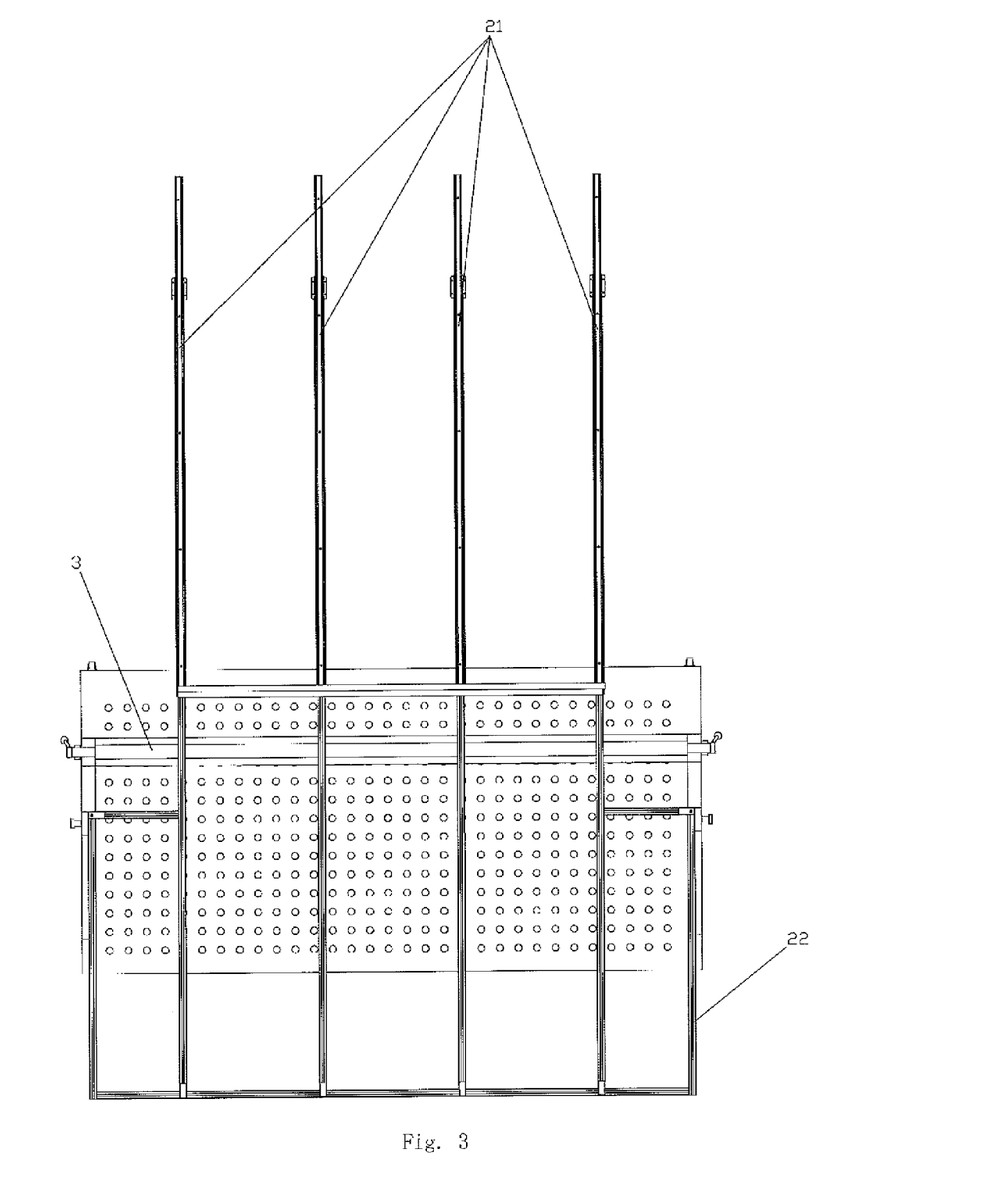
FIG. 3 is a plan view of a pick-and-place device of the glass substrate of the embodiment of the present invention.
Figure 4:
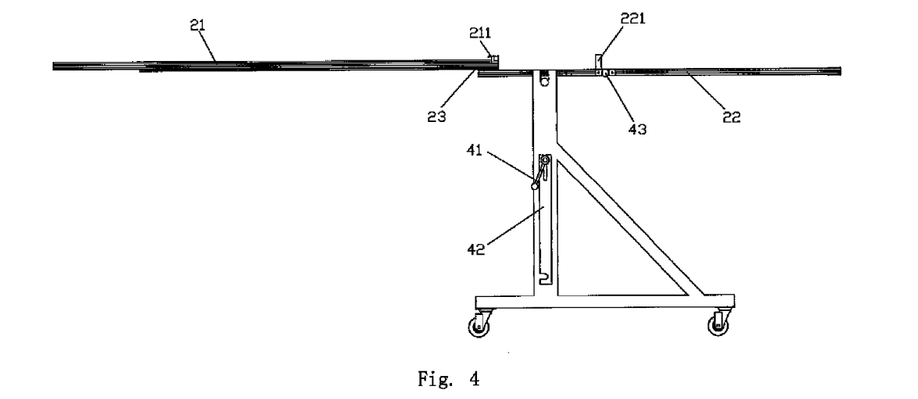
FIG. 4 is a left view of a pick-and-place device of the glass substrate of the embodiment of the present invention.

The first direction in this embodiment is the left-right direction in the left view as shown in FIG. 4, the first position is the position where the first supporting part 21 is extending, and the second position is the original position of the first support part, i.e. the position where the first support part is shrinking. The first support part 21 and the second support part 22 may be a support frame composed of four strip-shaped aluminum, the number and the length of the aluminum strip may be changed based on the actual needs, such as to be changed according to the size of the glass substrate to be picked and placed, and the materials of the first support part 21 and the second support part 22 are not limited to the aluminum alloy, but also the steel or other metal materials and the like can be used. When the first support part 21 is located at the first position, it is convenient to pick the glass substrate on the base table of the pick-and-place apparatus to the first support part 21, or place the glass substrate on the first support part 21 to the base table of the pick-and-place apparatus; when the first support part 21 is located at the second position, it can reduce the limit of the space when the substrate holder 2 is moving because the overall size of the substrate holder 2 shrinks, and now, it is more convenient to move the pick-and-place device.

In this embodiment, the sliding part 23 comprises a slider 231 and a rail 232, the slider 231 is provided at a lower surface of the first supporting part 21 in the first direction, the rail 232 is provided at an upper surface of the second supporting part 22 in the first direction, the first supporting part 21 is provided on the second supporting part 22 by the slider 231 cooperating with the rail 232, and the first support part 21 is capable of moving with respect to the second support part 22 in the first direction under the action of the sliding part 23. Note that the structure of the sliding part 23 is not limited to the structure comprising the slider and the rail as the present embodiment described, it can also be replaced by other structures that can achieve the first support part 21 moving with respect to the second support part 22.

Selectively, the bracket 1 comprises a support beam 11 and a bottom pedestal 12, the support beam 11 is provided in a vertical direction relative to the bottom pedestal 12 to form an almost "L" shape, and stiffeners 112 are disposed between the support beam 11 and the bottom pedestal 12 to avoid the pick-and-place device pouring when the first support part 21 extends to the first position. Wherein, the set number of stiffeners 112 can be adjusted according to the needs. The bottom of the bottom pedestal 12 is provided with movable guide wheels 121 for convenient of pick-and-place device moving.

Preferably, when the pick-and-place device is moving, in order to prevent the glass substrate in the pick-and-place device from shaking transversely and sliding away from the pick-and-place device due to the dynamic action of moving, both sides of the second support part 22 are oppositely provided with stoppers 221 to position the glass substrate in the transverse direction.

Figure 6:
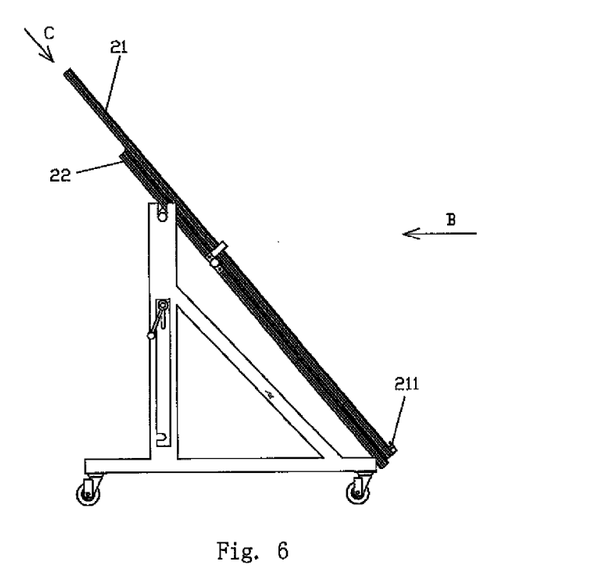
FIG. 6 is a left view of a pick-and-place device of the glass substrate when the substrate holder is located in an inclined position of the embodiment of the present invention.
Figure 7:
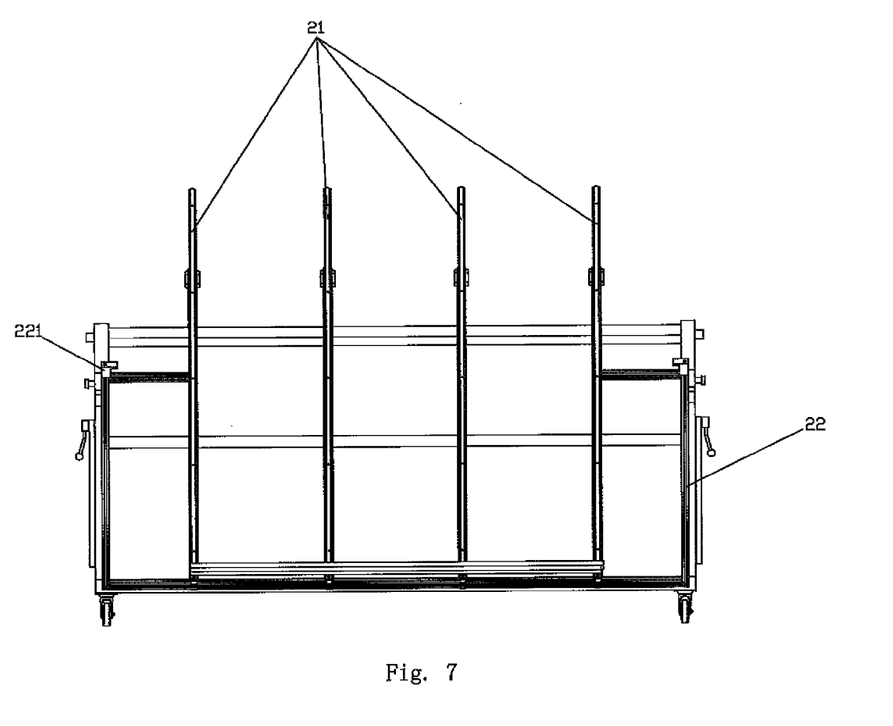
FIG. 7 is a B view of FIG. 4.
Figure 8:
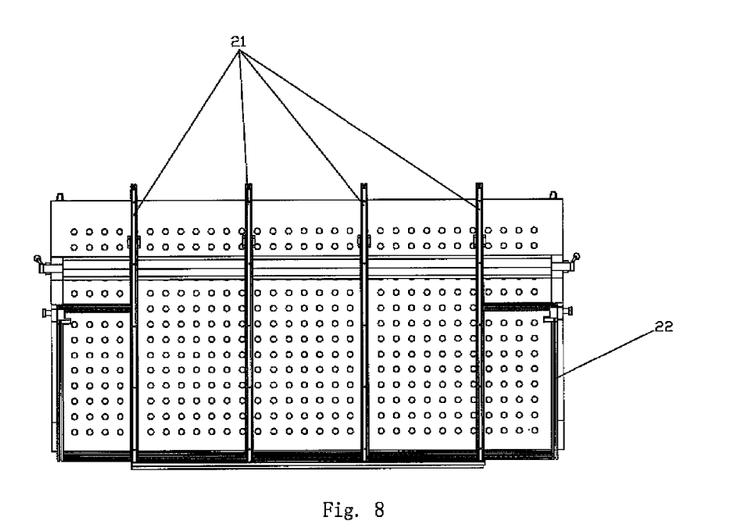
FIG. 8 is a C view of FIG. 4.
Figure 9:
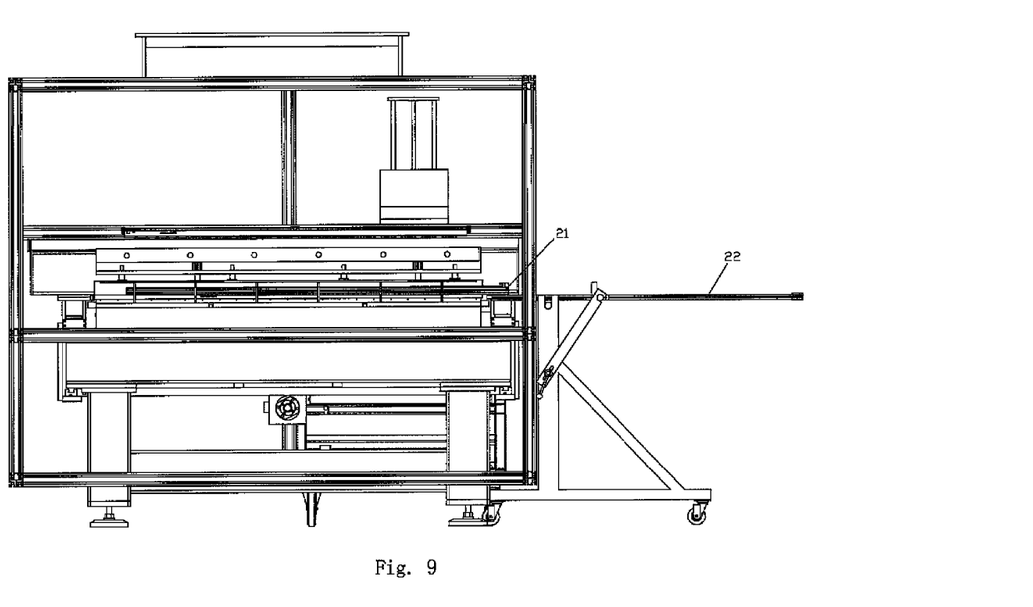
FIG. 9 is a schematic view of a pick-and-place device of the glass substrate picking and placing the glass substrate on the base table of pick-and-place apparatus of the embodiment of the present invention.

Preferably, in order to further reduce the occupied space when the pick-and-place device moves, a rotation axis 3 arranged in the second direction of the bracket 1 is provided below the second support part 22, the rotation axis 3 is rotatably provided on the bracket 1, the substrate holder 2 is assembled on the bracket 1 by the rotation axis 3, and the substrate holder 2 is located in a horizontal position or an inclined position driven by the rotation axis 3, wherein, the second direction is the transverse direction of the bracket 1, and the second direction is perpendicular to the first direction. As shown in FIG. 6, when the substrate holder 2 is located in inclined position, it can reduce the occupied space above the pick-and-place device when the substrate holder 2 is located in the horizontal position.

Preferably, in order to ensure the pick-and-place device moving through the narrow channel, the rotation axis 3 is detachably provided on the bracket 1. When the pick-and-place device is needed to move though the narrow channel, two operators can remove the rotation axis 3 from the bracket 1 and lift up the substrate holder 2 at the same time, and then assemble the rotation axis 3 on the bracket 1 after moving through the channel.

Preferably, in order to prevent the glass substrate from sliding away from the substrate holder 2 at the inclined position under the action of gravity, the bottom end of the first supporting part 21 is provided with a resist part 211. Wherein, the resist part of the present embodiment is optionally an L-shaped baffle that mating with the thickness of the glass substrate. The resist part can be a strip-shaped baffle.

Figure 5:
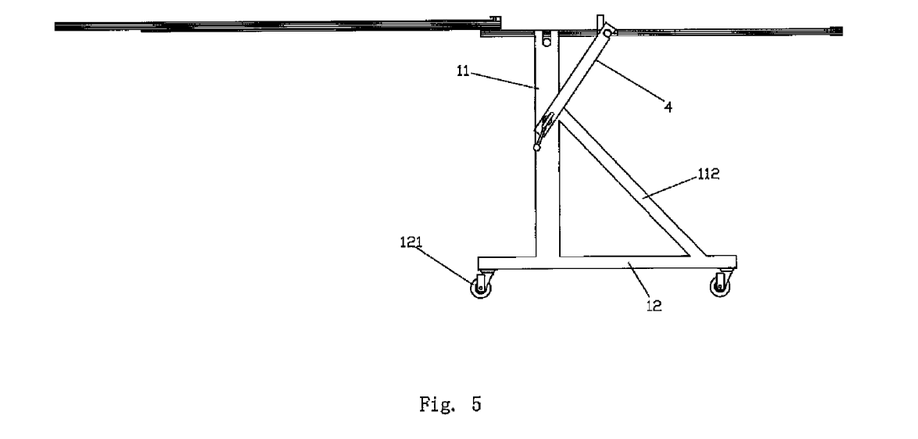
FIG. 5 is a left view of a pick-and-place device of the glass substrate which is supported by a horizontal positioning mechanism of the embodiment of the present invention.

Preferably, since the substrate holder 2 can rotate driven by the rotation shaft 3, in order to ensure the substrate holder 2 is always located in the horizontal position, a horizontal positioning mechanism 4 may also be provided in the pick-and-place device, when substrate holder 2 is located in the horizontal position, one end of the horizontal positioning mechanism 4 is fixed to the bracket 1, the other end is connected to the substrate holder 2 and supports the substrate holder 2 in the horizontal position as shown in FIG. 5. Then, as shown in FIG. 4, in this embodiment, the horizontal positioning mechanism 4 comprises a handle 41, a support arm 42 and a connecting protrusion 43, the handle 41 and one end of the support arm 42 are rotatably connected to the bracket 1 by a screw bolt, the other end of the support arm 42 is provided with a slot, the connecting protrusion 43 is provided at a side part of the second support portion 22 and projects in the second direction toward the outside of the second support part 22; when the substrate holder 2 is located in the horizontal position, the support arm 42 is rotated upward and the slot on the other end of the support arm 42 is capable of clasp with the connecting protrusion 43, and then the handle 41 is tightened to fix the first end of the support arm 42 to the bracket 1 and the substrate holder 2 is supported in the horizontal position by the support arm 42. The horizontal positioning mechanism 4 is not limited to the above structure; it can also be replaced by other structure that can support the substrate holder in the horizontal position.

The pick-and-place device of the glass substrate disclosed in above embodiments has a simple structure and can be operated easily, and it can achieve for picking and placing the glass substrate, especially for firmly picking and placing the large-size glass substrate.

The instructions for using the pick-and-place device of the glass substrate in the embodiments of the present invention will be described:

First, the pick-and-place device is brought to near the base table of the apparatus by the movable guide wheels therebelow. Then, the substrate holder is lifted up and clasped by the horizontal positioning mechanism, so that the surface of the substrate holder is horizontal to the glass substrate to be picked and placed, in this way the substrate holder can keep in horizontal state. The operator holds and pushes the first support part, extending into the lower part of the glass substrate. Then the support pillar of the glass substrate supported by the base table of the apparatus declines, and the glass substrate lands on the first support part. The first support part is pulled to carry the glass substrate and pull it out of the base table of the apparatus. Finally, the horizontal positioning mechanism is removed to make the substrate holder inclined, and the inclined substrate holder is clasped by the pad feet block. Now, the operator can hold and pull the pick-and-place device of the glass substrate to move to the target position. If the pick-and-place device is needed to move though the narrow channel, two operators can lift up the substrate holder at the same time to separate the rotation shaft and the bracket so as to move through the channel respectively and then to be combined together to move to the target position integrally.

The above described embodiments are only the preferred embodiments of the present invention, it should be pointed out that, it can be made some improvements and embellish on the premise of without departing from the principle thereof by those skilled in the art, these improvements and embellish should be seen as the protection scope of the present invention as well.

What is claimed is:

1. A pick-and-place device of a glass substrate, comprises a bracket and a substrate holder, wherein
    the substrate holder comprises a first support part, a second support part and a sliding part, the first support part is provided on the second support part by the sliding part, the first support part is capable of moving with respect to the second support part between a first position and a second position under the action of the sliding part, and when the first support part is located at the first position, the first support part integrally protrudes outward of the second support part, when the first support part is located at the second position, the first support part is integrally located right above the second support part,
    wherein a rotation axis arranged perpendicular to the moving direction of the first support part is provided below the second support part; the rotation axis is rotatably provided on the bracket, and the substrate holder is located in a horizontal position or an inclined position driven by the rotation axis,
    the pick-and-place device further comprises a horizontal positioning mechanism, when the substrate holder is located in the horizontal position, one end of the horizontal positioning mechanism is fixed to the bracket, the other end of the horizontal positioning mechanism is connected to the substrate holder and supports the substrate holder in the horizontal position, and
    the horizontal positioning mechanism comprises a handle, a support arm and a connecting protrusion, the handle and one end of the support arm are rotatably connected to the bracket by a screw bolt, the other end of the support arm is provided with a slot, the connecting protrusion is provided at a side part of the second support part, and with the slot on the other end of the support arm capable of clasp with the connecting protrusion.

2. The pick-and-place device of a glass substrate according to claim 1, wherein the rotation axis is detachably provided on the bracket.

3. The pick-and-place device of a glass substrate according to claim 1, wherein an end of the first supporting part is provided with a resist part to prevent a glass substrate placed on the substrate holder at the inclined position from sliding away.

4. The pick-and-place device of a glass substrate according to claim 3, wherein the resist part is an L-shaped baffle that mating with the thickness of the glass substrate.

5. The pick-and-place device of a glass substrate according to claim 3, wherein the resist part is a strip-shaped baffle.

6. The pick-and-place device of a glass substrate according to claim 1, wherein the first support part and the second support part are a support frame composed of four strip-shaped metals.

7. The pick-and-place device of a glass substrate according to claim 1, wherein the sliding part comprises a slider and a rail, the slider is provided at a lower surface of the first supporting part, the rail is provided at an upper surface of the second supporting part, the first supporting part is provided on the second supporting part by the slider cooperating with the rail, and the first support part moves between the first position and the second position under the action of the sliding part.

8. The pick-and-place device of a glass substrate according to claim 1, wherein the bracket comprises a support beam and a bottom pedestal, and the support beam is provided at the bottom pedestal in a vertical direction to form an L-shape.

9. The pick-and-place device of a glass substrate according to claim 8 wherein stiffeners are disposed between the support beam and the bottom pedestal.

10. The pick-and-place device of a glass substrate according to claim 8, wherein the bottom of the bottom pedestal is provided with movable guide wheels.

11. The pick-and-place device of a glass substrate according to claim 1, wherein both sides of the second support part are oppositely provided with stoppers to position the glass substrate in the transverse direction.

12. The pick-and-place device of a glass substrate according to claim 7, wherein both sides of the second support part are oppositely provided with stoppers to position the glass substrate in the transverse direction.

13. The pick-and-place device of a glass substrate according to claim 8, wherein both sides of the second support part are oppositely provided with stoppers to position the glass substrate in the transverse direction.

14. The pick-and-place device of a glass substrate according to claim 1, wherein the first position is the position where the first supporting part is extending, and the second position is the position where the first support part is shrinking.

15. The pick-and-place device of a glass substrate according to claim 7, wherein the first position is the position where the first supporting part is extending, and the second position is the position where the first support part is shrinking.

16. The pick-and-place device of a glass substrate according to claim 8, wherein the first position is the position where the first supporting part is extending, and the second position is the position where the first support part is shrinking.

* * * * *